Feb. 6, 1973    H. J. MUMMA    3,715,024
FRUIT ORIENTING APPARATUS
Filed April 23, 1971    6 Sheets-Sheet 1

FIG_1

INVENTOR.
HAROLD J. MUMMA
BY
ATTORNEYS

FIG_4

FIG_3

United States Patent Office 3,715,024
Patented Feb. 6, 1973

3,715,024
FRUIT ORIENTING APPARATUS
Harold J. Mumma, Riverside, Calif., assignor to FMC Corporation, San Jose, Calif.
Filed Apr. 23, 1971, Ser. No. 136,809
Int. Cl. B65g 47/24
U.S. Cl. 198—33 AA
8 Claims

ABSTRACT OF THE DISCLOSURE

An apparatus for orienting oblate spheroidally shaped fruit so that they roll upright on their major circumference includes pairs of parallel grommeted rollers having annular fruit contacting surfaces which cooperate to form fruit retaining pockets. Each roller of a pair of rollers rotates at a speed different from that of the other roller of the pair with the slowest rotating one of the two rollers contacting the fruit on two spaced circumferential bands and the faster moving one contacting the fruit on a circumferential band intermediate the two contact bands of the slower roller. Frictional contact between the rollers and a fruit retained thereby causes the fruit to shift around in the pocket until there is substantially no relative surface movement between the rollers and the fruit at the points of contact. When this state is attained, the fruit is rolling on its major circumference with the major circumferential area being in contact with the faster moving roller and with the smaller circumferences of the fruit, which are laterally displaced from the major circumference, being in contact with the slower moving roller. In such position, the stem-blossom axis of the fruit is substantially horizontal and perpendicular to the direction of movement of the rollers.

BACKGROUND OF THE INVENTION

Field of the invention

The present invention relates generally to the art of processing and marking fruit but more particularly concerns an apparatus for orienting a fruit having an oblate spheroidal shape so that it rolls upright on its major circumference.

Description of the prior art

In the art of marking fruit with legible indicia, it has been common practice to retain the fruit in pockets between uniformly rotating grommeted conveyor rollers and to pass the rolling fruit beneath a marking wheel which has a surface or tangential velocity equivalent to and in the same direction as that of the fruit. Such an apparatus is disclosed in co-pending United States patent application Ser. No. 687,871 of Mumma et al. which is of common ownership with the present application. An apparatus of this type is adequate for marking most substantially spherically shaped fruits; however, when fruit having an oblate spheroidal shape, i.e., with flattened stem and blossom end portions, are processed by such an apparatus, a legible mark will not always be imprinted on the object. This is due to the fact that in such an apparatus the fruit are rolled in random circumferential paths by the conveyor rollers whereby a flattened end of the fruit may be presented to the marking wheel. In such a case the flattened area, which is depressed with respect to the remaining area (i.e., the major circumferential area) of the fruit, may pass beneath the marking wheel and make little or not contact with the printing dies on the periphery thereof whereby no mark, or at best an illegible mark, will be imprinted on the fruit.

SUMMARY OF THE INVENTION

In order that oblate spheroidally shaped objects, such as mandarin oranges or the like, will be legibly and reliably marked by a rotary marking apparatus, such as that disclosed in the hereinbefore mentioned United States patent application Ser. No. 687,871 for example, it is necessary that the object be oriented upon presentation to the rotary marking wheel so that the major circumferential area, and not the flattened end portions of the object, is in position for marking. Inasmuch as an oblate spheroid by definition has a major circumferential area and axially displaced flattened end portions, the appropriate orientation of the object can be obtained by rolling the object on its major circumference whereby the dies on the marking wheel will always contact the major circumferential area.

The apparatus of the present invention is concerned with conveying a plurality of articles, such as mandarin oranges, to the fruit marking apparatus and orienting the articles as they are conveyed so that they are rolling on their major circumference when presented to the marking apparatus whereby the major circumferential area of each article is, in fact, always aligned with the marking dies during the marking operation. The fruit orienting apparatus, herein described in the form of a conveyor, basically includes a first set of spaced parallel grommeted rollers and a second set of spaced parallel grommeted rollers parallel to and interspaced between the first set of rollers. An individual roller from the first set and one from the second set constitute a pair of rollers having adjacent, generally concave surfaces which cooperatively define pockets in which the fruit are retained. Both sets of rollers are rotatably mounted at their ends and move as a unit toward the marking apparatus in a single direction normal to their longitudinal axes.

Grommets on the rollers of the first set are positioned on the rollers and shaped so as to contact each fruit at two spaced locations. The grommets on the rollers of the second set are longitudinally spaced on the rollers to contact the fruit in an area intermediate the spaced locations contacted by the grommets of the first set of rollers. The rollers are moved toward the marking apparatus and the rollers of both sets are all rotatably driven in the same direction with the rollers of the second set being rotated faster than the rollers of the first set so that the peripheral speeds of the grommets of said first set of rollers at their points of contact with the fruit are less than the peripheral speed of the grommets of said second set of rollers at their point of contact with the fruit. A fruit disposed in a pocket defined by said grommets between a pair of rollers will be acted upon by forces of different magnitude created by its frictional engagement with the speed-differentiated rollers, and these forces will cause the fruit to rotate in the pocket not only about an axis parallel to those of the rollers but also about an axis perpendicular to the axes of the rollers until the fruit achieves a stable position in the desired orientation.

To better understand how and why the orienting apparatus is able to cause oblate spheroidally shaped fruit to rotate until the plane through their major circumference is oriented in the direction of movement of the rollers, it is important to comprehend the geometry of an oblate spheroid. An oblate spheroid may be defined as a sphere having flattened end portions whereby planes parallel to the flattened end portions and normal to the axis of generation (the stem-blossom axis of a fruit) intersect the surface of the oblate spheroid to define circles of diminishing circumference as they are spaced outwardly from a plane intersecting the spheroid on its major circumference, i.e., its largest circumference. Keeping this definition in mind, it can be seen that an oblate fruit rolled along its major circumference so as to rotate about its stem-blossom axis will have a greater tangential or linear velocity on its major circumference than at points on the surface laterally displaced from the major circumference. Furthermore, it will be seen that when an oblate fruit is placed in a pocket having two rotating laterally disposed fruit contacting surfaces and one faster rotating fruit contacting surface intermediate the laterally disposed surfaces, the frictional forces exerted on the fruit by the rotating contacting surfaces will urge the fruit to an oriented position wherein there is the least amount of relative surface motion between the contacting surfaces and the fruit. This position will be the one wherein the major circumference is in contact with the faster rotating surface and the laterally displaced smaller circumferences of the fruit are in contact with the slower moving laterally displaced rotating surfaces.

In such a position, the fruit is rolling upright on its major circumference thereby assuring that when the fruit reaches the marking apparatus the surface area of the fruit in the immediate proximity of the major circumference, and not that near the flattened stem or blossom end portions, will be presented for printing contact with a die on the overlying rotary marking device.

Accordingly, it is an object of the present invention to provide an orienting apparatus that will orient objects having an oblate spheroidal shape so that they are rolling in an upright position on their major circumference.

It is another object to provide a conveyor that will support and orient oblate spheroidally shaped objects so that they are rolling on their major circumference.

It is still another object to provide a feed conveyor for a marking apparatus whereby oblate spheroidally shaped objects carried by the conveyor will always be presented to the marker while rolling on their major circumference.

DESCRIPTION OF THE PREFERRED EMBODIMENT

Figure 1:
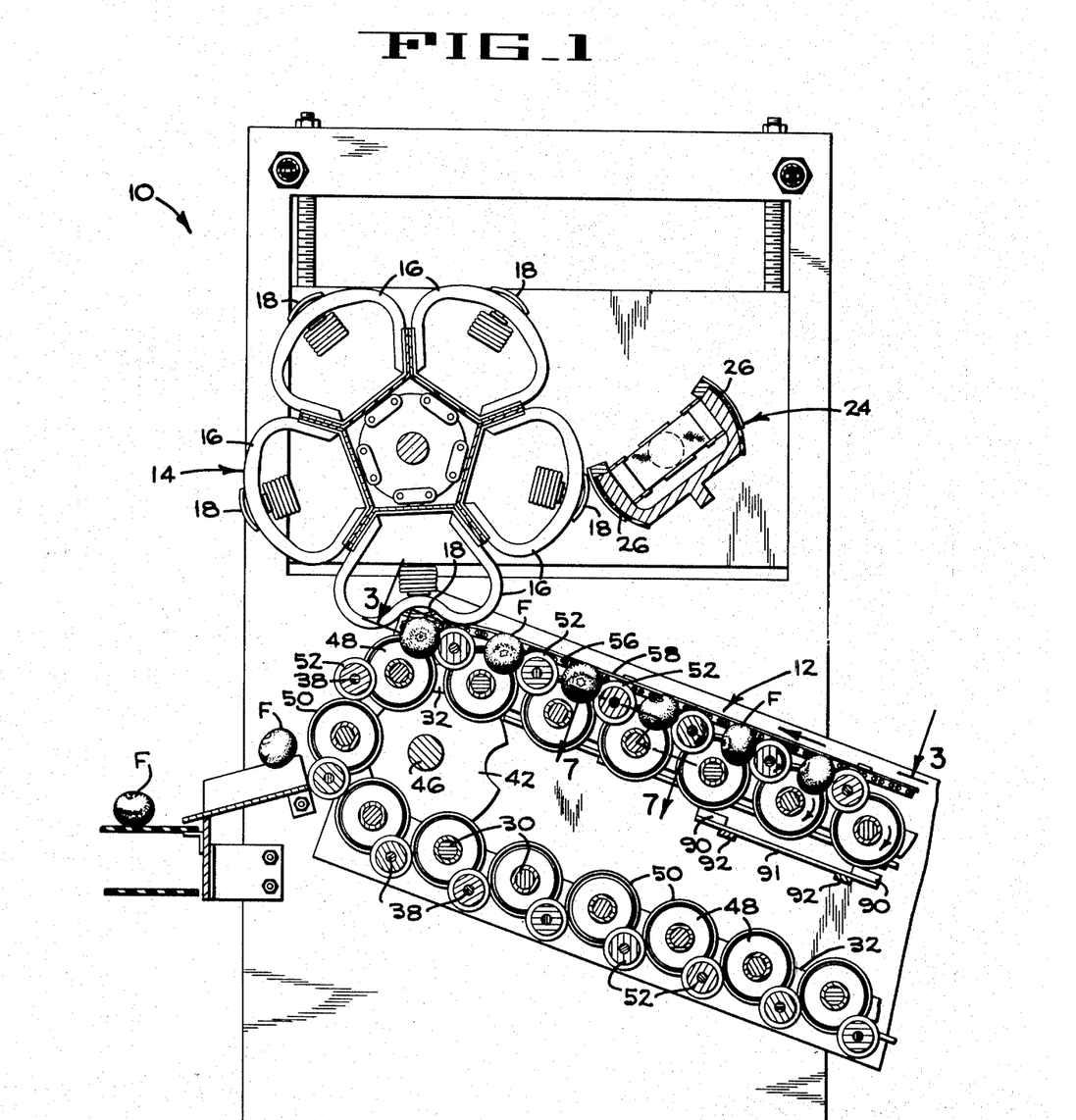
FIG. 1 is a central longitudinal section through a fruit marking machine which includes the orienting conveyor of the present invention.
Figure 2:
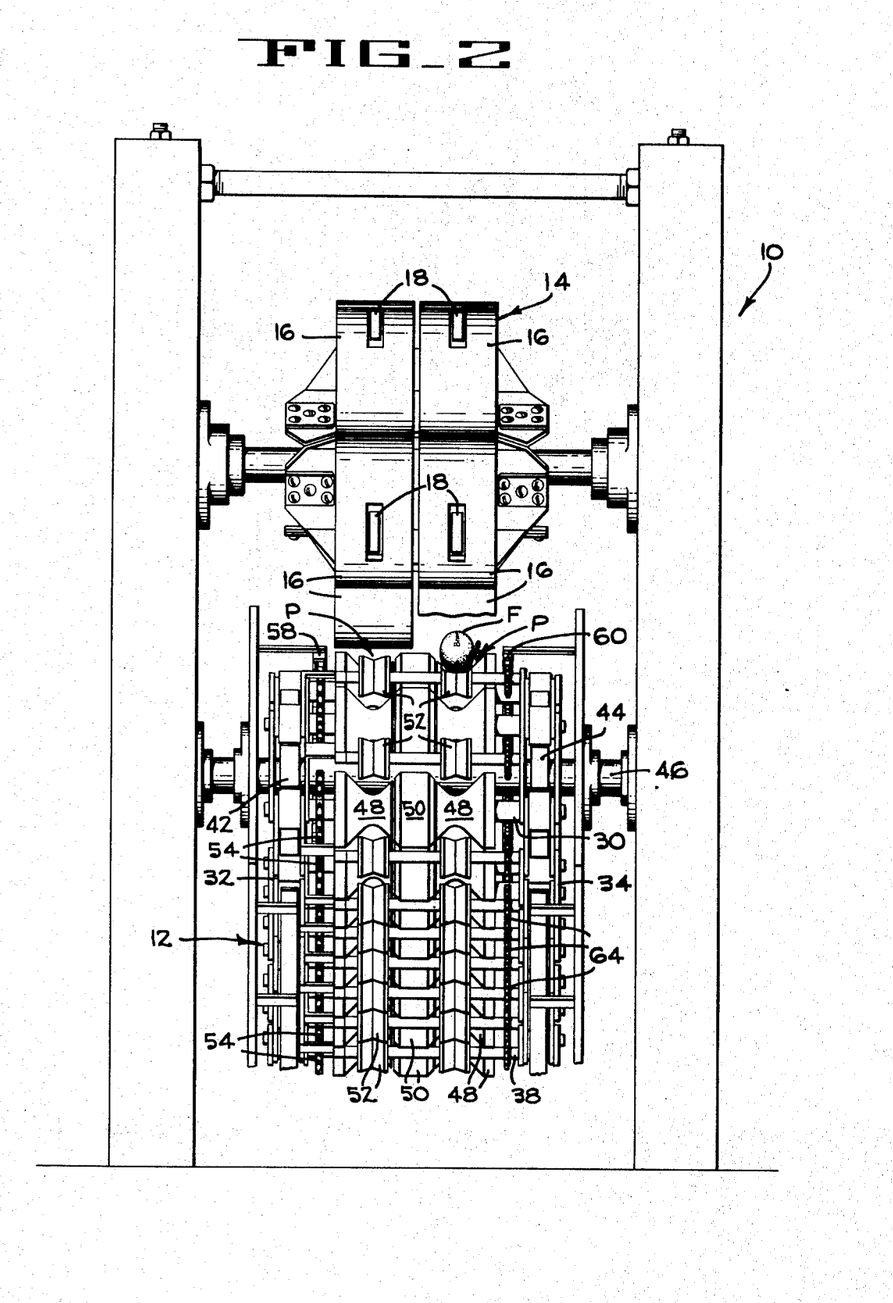
FIG. 2 is a fragmentary front elevation of the machine of FIG. 1.
Figure 3:
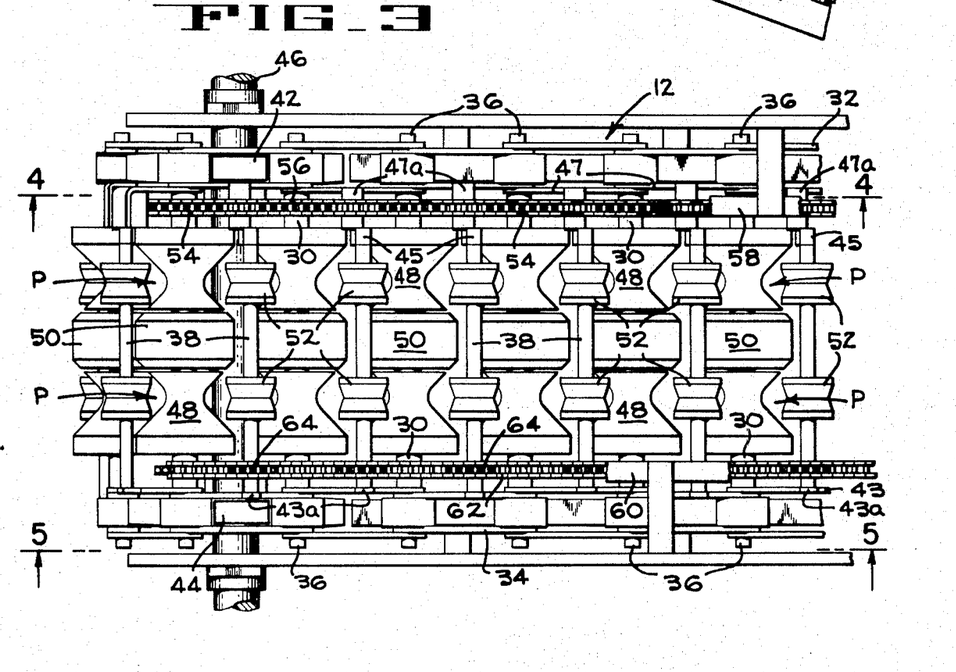
FIG. 3 is an enlarged view looking in the direction of arrows 3—3 of FIG. 1 showing the terminal portion of the fruit-carrying run of the orienting conveyor.

The fruit orienting apparatus of the present invention is shown in FIGS. 1 and 2 incorporated into a fruit marking machine 10 similar to the machine disclosed in the hereinbefore mentioned co-pending patent application Ser. No. 687,871 of Mumma et al. The fruit marking machine includes a conveyor 12, incorporating the concepts of the present invention, which is provided to carry a plurality of fruit F in longitudinally spaced pockets in aligned transverse lanes to a position beneath a rotary marking wheel 14. The marking wheel is generally comprised of a plurality of aligned transverse rows of angularly spaced fruit gripping members 16 each carrying a marking die 18 centrally positioned upon its outer arcuate periphery. As can be seen in FIG. 2, there are two sets of angularly mounted gripping members 16 spaced transversely of the marking wheel with each of the sets of the fruit gripping members corresponding to and being vertically aligned with one lane of the fruit carrying conveyor.

The marking dies are provided with raised indicia or type on their outer surface which is supplied with ink, and, as each fruit gripping member is rotated into a position directly above the surface of the conveyor, the die attached to its outer face will be carried into compressive engagement with the uppermost surface of the fruit to transfer an ink mark thereto corresponding to the configuration of said type. As best seen in FIG. 1, an inking member 24 is mounted for rotation adjacent to the marking wheel structure, the inking member being provided with an ink-carrying ribbon 26 extending along its opposed arcuate faces for compressive engagement with each of the dies on the marking wheel to transfer ink thereto just prior to its engagement with the fruit on the conveyor. Inasmuch as the specifics of the marking wheel and inking member are not critical to an understanding of the present invention, a detailed description will not be presented herein. A more complete description of the marking wheel and inking member may be had by reference to the beforementioned Mumma et al. United States patent application.

Figures 5, 9:
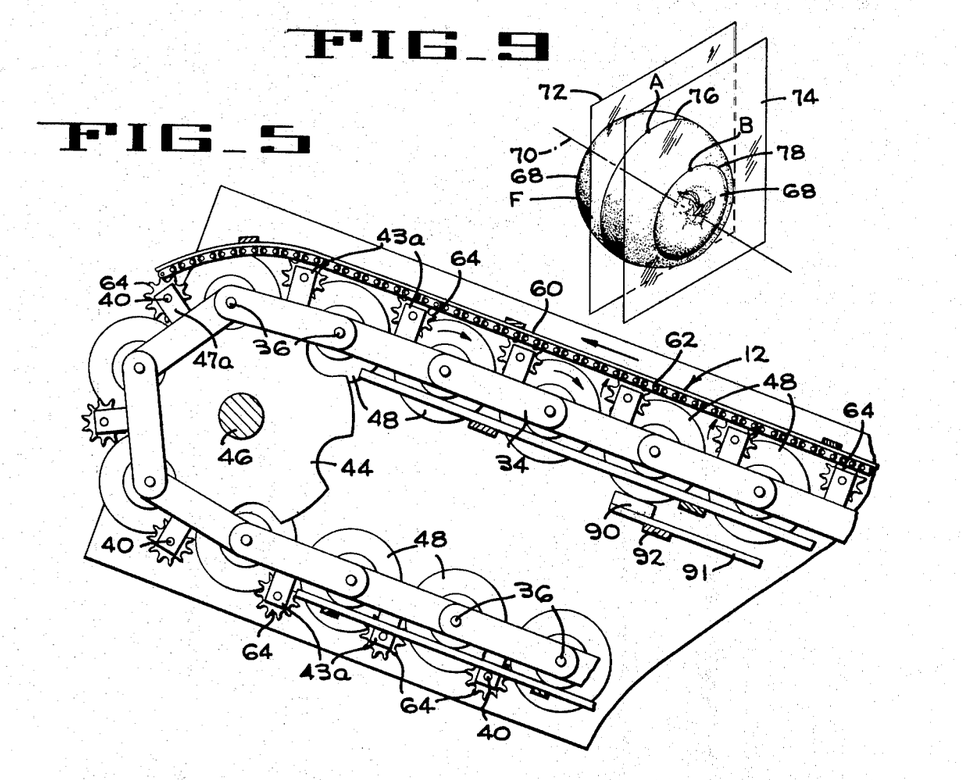
FIG. 5 is a fragmentary section taken along line 5—5 of FIG. 3.
FIG. 9 is an isometric view of a mandarin orange having an oblate spheroidal shape which view illustrates the geometric features of the orange that are pertinent to an understanding of the method of the present invention.
Figures 6, 10:
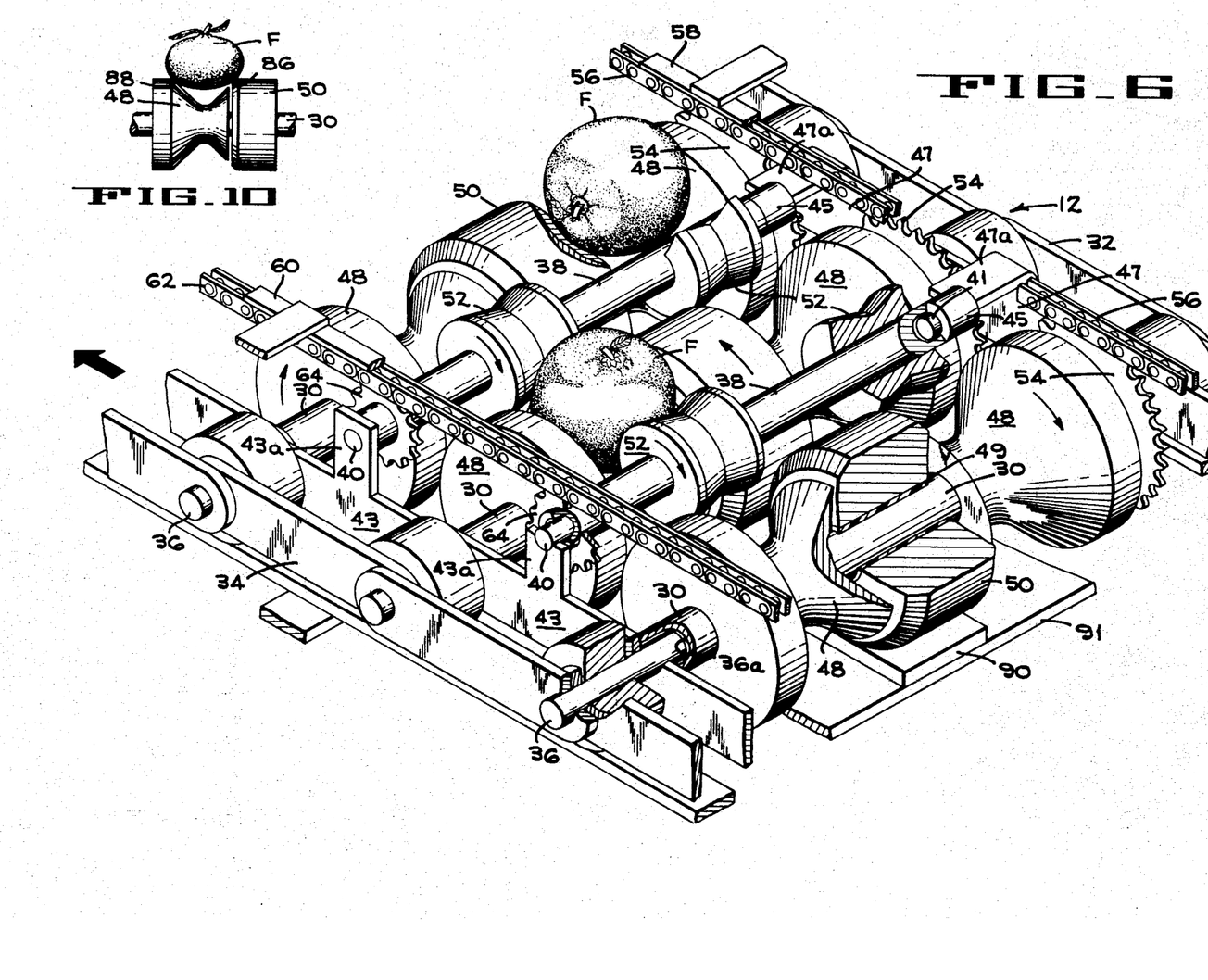
FIG. 6 is an enlarged fragmentary isometric with parts broken away showing a portion of the orienting conveyor of FIG. 3.
FIG. 10 is a fragmentary diagrammatic view of a portion of one of the grommeted rollers of the present invention with a fruit in contact therewith.

The fruit orienting apparatus of the present invention, shown herein in the form of the conveyor 12, can best be seen in FIG. 6 to include a first set of rollers 30 rotatably connected to a pair of parallel conveyor chains 32 and 34 by elongated chain pins 36 which are rotatably received within axial mounting holes 36a in the ends of the rollers. Mounted parallel to and interspaced with the first set of rollers are a second set of rollers 38 which are rotatable at their ends by means of pins 40 and 41. The pins 40, which rotatably mount one end of each of the rollers 38, are integral with and extend inwardly from upwardly projecting mounting arms 43a on the inner links 43 of the conveyor chain 34. The pins 41, which rotatably mount the other ends of the rollers 38, are integral with and extend inwardly from a boss 45 welded or otherwise rigidly secured to an inwardly extending arm 47a of T-shaped inner links 47 of the conveyor chain 32. The first set of rollers is seen to lie across the conveyor transversely to its length with the rollers thereof being arranged in parallel relationship, and the second set of rollers is disposed parallel to the first set with the rollers thereof being interspaced between the rollers of the first set but in a slightly elevated position. Both sets of rollers are thus mounted to move as a unit with the conveyor chains. The conveyor chains 32 and 34 travel in an inclined endless loop with the uppermost ends of the chains being trained about drive sprockets 42 and 44, respectively (FIGS. 1 and 5), and the lowermost ends being trained about free wheeling sprockets (not shown) at the fruit input end of the conveyor. The drive sprockets 42 and 44 are keyed to a shaft 46 arranged to be continuously driven during operation of the marking machine 10 by drive means which are not herein shown but which are clearly described in the beforementioned Mumma et al. United States application Ser. No. 687,871.

As best seen in FIG. 6, at spaced positions along the rollers 30 of the first set there are provided a pair of grommets 48 of a rubber or rubberlike material which are securely fixed to the cylindrical roller surface for rotation therewith. Disposed between each pair of large grommets 48 is a free-wheeling grommet 50 of generally cylindrical shape the purpose and function of which will be explained later. Each grommet 50 is mounted on a Teflon bushing 49 loosely secured about the associated roller 30 for relative rotation with respect thereto.

Referring still to FIG. 6, it will be seen that each of the rollers 38 of the second set are provided with small grommets 52 which are spaced along the rollers so as to align longitudinally of the conveyor with the grommets 48 of the rollers 30. It can be seen that the grommets 48 and the grommets 52 are annularly grooved to provide pockets P, between the respective grommets, in which a fruit F can be retained. In the disclosed embodiment of the invention there are two such pockets between every pair of rollers comprised of one roller from the first set and an adjacent roller from the second set. Along the length of the conveyor these pockets define two longitudinal lines of pockets in which fruit can be retained, each line being aligned with a set of fruit grippers 16 on the marking wheel 14.

Figure 4:
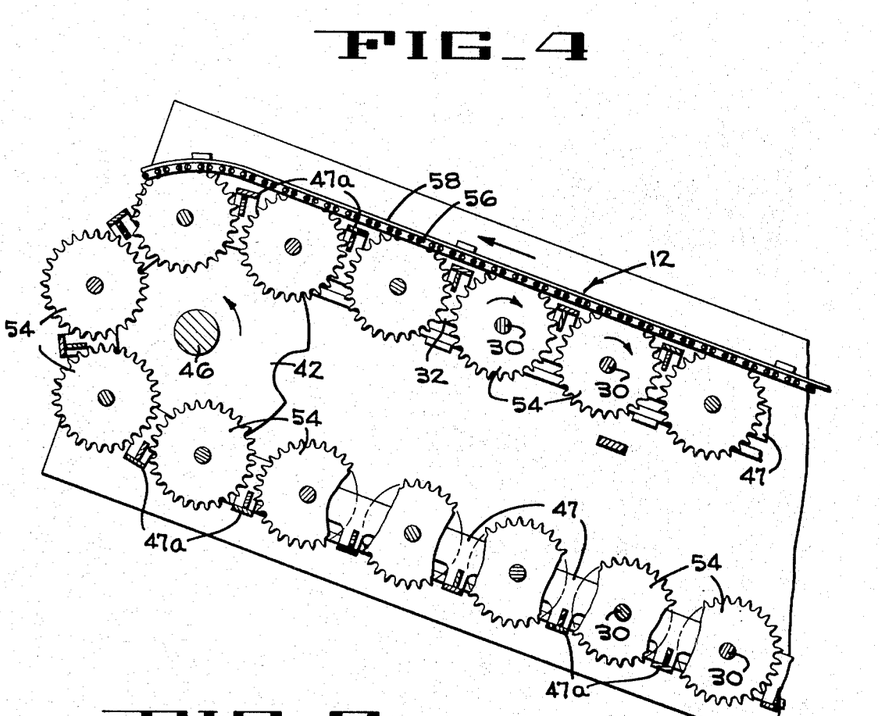
FIG. 4 is a section taken along line 4—4 of FIG. 3.

The rollers 30 of the first set of conveyor rollers are provided at one end with a relatively large diameter sprocket 54 (FIGS. 4 and 6) which is keyed to the roller. The sprockets 54 mesh with a stationary roller chain 56 fixed to the underside of a stationary support bracket 58 (FIG. 4) which extends parallel to, above, and along one side of the entire length of the upper, fruit-carrying run of the conveyor 12. The support bracket 58 is integral with and extends inwardly from one of the side frame members of the machine 10 (FIG. 2).

On the opposite side of the conveyor is a second support bracket 60 (FIG. 5), identical to support bracket 58, which supports a second stationary roller chain 62. The roller chain 62 extends parallel to and above the conveyor and meshes with relatively small sprockets 64 that are keyed to one end of each of the rollers 38 of the second set of conveyor rollers.

It can thus be seen that as the roller conveyor is being advanced by the conveyor chains 32 and 34, the rollers 30 and 38 of the first and second sets respectively are caused to be rotated in the direction of the arrows (FIGS. 1, 4 and 5) by the meshing of sprockets 54 and 64 with the stationary roller chains 56 and 62, respectively. Inasmuch as the sprockets 64, which are attached to rollers 38, are smaller in circumference than the sprockets 54 on rollers 30, the rollers 38 will be caused to rotate at a faster rate than the rollers 30.

Figure 7:
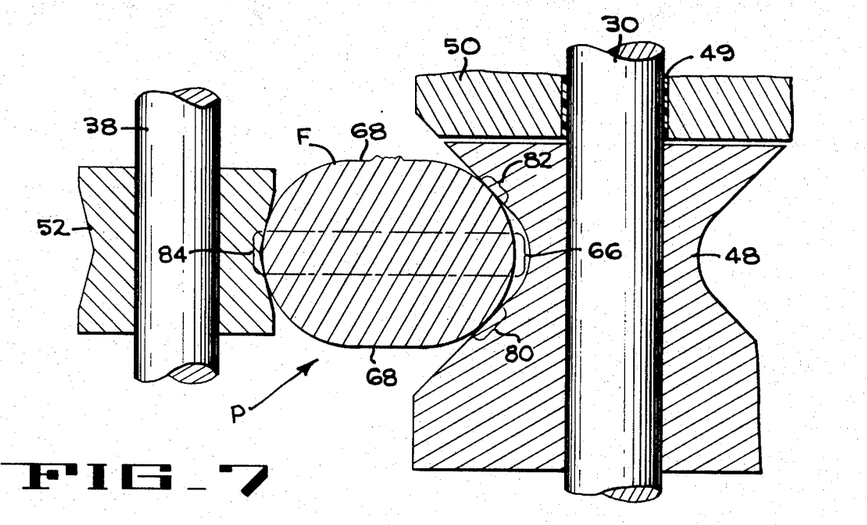
FIG. 7 is an enlarged fragmentary section taken along line 7—7 of FIG. 1; rollers are shown in displaced or developed relation to an intermediate fruit to illustrate the contact zones of the rollers with the fruit.

The rotative speed differential between the rollers 30 of the first set and the rollers 38 of the second set enables the conveyor 12 to orient fruit or other objects having an oblate spheroidal shape so that each of the objects rotates in a pocket P formed between the grommeted rollers of the conveyor while standing upright on its major circumference, as shown in FIG. 7 for example. Therefore, when the fruit is presented to the marking wheel 14 for the imprinting of a mark thereon, the major circumferential area 66 (FIG. 7) of the fruit will be positioned centrally in the pocket for engagement with the marking wheel. This is important in the marking of fruit which is not substantially spherical in shape but rather has the shape of an oblate spheroid. In the case of an oblate spheroidally shaped fruit, it is possible that a depressed flattened end portion 68 (FIG. 7) of the fruit will be presented to the marking wheel when the fruit is carried by conventional roller type conveyors where all the grommeted rollers are rotated at the same speed. In such a case, the flattened ends may not extend high enough to make positive printing engagement with the marking wheel whereby no mark, or at best an illegible mark will be imprinted on the fruit.

It should be also noted that the linear speed of the conveyor 12, the rotative speeds of the rollers on the conveyor, and the rotative speed of the marking wheel are all pre-selected so that the surface or tangential speed of the object to be marked, in the major circumferential area where it is to be marked, is identical to the surface or tangential speed of the dies on the marking wheel. This assures the imprinting of a clear mark which will not be blurred by relative movement between the marking dies and the fruit surface.

The manner in which the fruit orienting apparatus of the present invention functions to stand oblate spheroidally shaped fruit upright on their major circumference can best be illustrated by reference to FIGS. 7 and 9. In FIG. 9, a symmetrical mandarin orange having an oblate spheroidal shape is shown with an axis of generation 70. If parallel planes 72 and 74 are passed through the orange so as to be perpendicular to the axis 70 and parallel to the flattened ends 68, it will be seen that the resultant circular cross-sections will have circumferences 76 and 78 respectively. The plane 72 divides the orange in half so that circumference 76 is the largest circumference of the orange which can be generated in this manner and is, therefore, the major circumference. The plane 74 passes through the orange at a location laterally displaced from the plane 72 and, therefore, the circumference 78 is smaller than circumference 76. It is thus clearly seen that if the orange were rotated about its axis of generation 70, a point A on the major circumference 76 would have a greater linear or tangential velocity at any instant than would a point B on the smaller laterally displaced circumference 78.

As discussed hereinabove, the apparatus of the present invention is characterized by a pair of rollers having a rotative speed differential which rollers coperate to form a fruit retaining pocket therebetween with the fruit being contacted by grommets on each of the rollers. Inasmuch as each roller is rotating at a different speed it is evident that the frictional force at a point of contact between the fruit and a supporting grommet will depend upon the tangential or linear speed of the grommet at that point which, in turn, will be dependent upon the rotational speed of the roller supporting the grommet as well as the radial distance of the contact point from the center of the roller. The locations at which these frictional forces have effect on the fruit, i.e., the supporting contact points of the grommets, are illustrated in FIG. 7. The fruit contacting grommet 48 of the slower rotating roller 30 will contact the fruit on two circumferential bands 80 and 82 near the sides of the pocket P. The fruit contacting grommet 52 of the faster rotating roller 38 will contact the fruit on circumferential band 84 intermediate the bands 80 and 82. It is to be understood that fruit deposited on the conveyor will ordinarily originally assume a position other than the one shown in FIG. 7. In fact, the fruit is normally randomly deposited on the conveyor so that they can originally assume any spacial orientation within a pocket. Therefore, the grommets 48 and 52 could originally contact the fruit in any of an infinite number of locations. However, with the exception of one position (to be specifically commented on hereinafter), no matter how the fruit is originally spacially oriented in a pocket, the grommet 48 will contact the fruit on spaced circumferential bands adjacent the lateral sides of the pocket and the grommet 52 will contact the fruit on a circumferential band intermediate the contact bands of grommet 48.

It will be undersood that when an oblate spheroidally shaped object is placed in a pocket in contact with rotating grommets being driven at different peripheral speeds, the frictional forces exerted on the object by the rotating surfaces will cause the object to shift around in the pocket until it assumes a stable position wherein there is the least amount of relative surface motion between the rotating surfaces and the rotating surface of the object. With regard to an oblate spheroidally shaped article such as a mandarin orange placed in the pocket defined by grommets 48 and 52, it will be seen that the object will shift around in the pocket due ot the unbalanced frictional forces acting thereon until the major circumference of the object is in contact with the circumferential band 84 (FIG. 7) at the center of the faster rotating grommet 52 and the relatively more slowly moving laterally displaced circumferences of the object, such as the circumference designated 78 (FIG. 9), are in contact with the circumferential bands 80 and 82 of the more slowly rotating grommet 48. In this position there is the least amount of relative surface motion between the object and the rotating grommets. As pointed out hereinbefore, when the object is in this position it is rotating about its axis 70 of generation in an upright position on its major circumference. When so oriented and presented to the marking wheel 14, a mark can be imprinted on the object in an area including or immediately adjacent to the major circumference.

Occasionally an orange deposited on the conveyor will originally assume the position shown in FIG. 10 wherein it lies in contact with grommets 48 and 50 at the respective sides of a pocket and with grommet 52 at the center of the pocket; that is to say, only one side of the orange will be contacted by the rotating grommet 48 while the other side thereof is contacted by the free wheeling grommet 50. If the fruit is substantially symmetrical, it will frequently flip over and over maintaining its balanced position over grommet 48 and it will not work its way down into the troughed portion of the grommet 48 wherein it can be shifted by the hereinbefore described cooperation between the grommets to assume the desired upright orientation whereby it is rolling on its major circumference. To assure that no fruit which is carried by the conveyor will long maintain the position shown in FIG. 10, each of the free wheeling grommets 50 is manipulated so as to spin the fruit about a secondary axis and cause it to move down into the troughed portion of the supporting grommet.

As can be seen in FIG. 10, the undesired position of the fruit is one wherein the major circumference of the fruit lies in the plane of the conveyor, i.e., where one side of the fruit lies in contact with the beveled edge of a free wheeling grommet 50 on a contact band 86 and the opposed side lies in contact with an adjacent grommet 48 on a contact band 88 at the outermost edge of the grommet. To disrupt the balance of the fruit and thus cause it to fall down into the troughed portion of the grommet 48, contact pads 90 (FIGS. 1 and 6) are rigidly mounted to the frame of the machine 10 on a support plate 91 carried by cross frame members 92 so that the pads lie immediately below the upper carrying run of the conveyor in a position whereby each of the free wheeling grommets 50 will engage a pad when a roller 30 passes thereover. It can be seen that this engagement will cause the grommets 50 to rotate, while in engagement with the pad, in a direction opposite to that in which the grommets 48 are rotating. This counter-rotation of the free wheeling grommets will cause a secondary spinning of the supported fruit about an axis perpendicular to the axis of its major rotary movement thereby disrupting the balance of the fruit and causing it to be shifted down into the troughed portion of the supporting grommet 48. There are two such pads 90 for each lane of fruit (FIG. 1) so that if the first spin imparted by the grommet does not shift the fruit completely off of the grommet, the second spin will. Once the fruit is tilted so that it will be supported only upon the grommets 48 and 52, it will be caused to move into an upright position rolling in its major circumference due to the speed differentiation between the supporting grommets as pointed out hereinbefore.

Figures 8A, 8B, 8C, 8D:
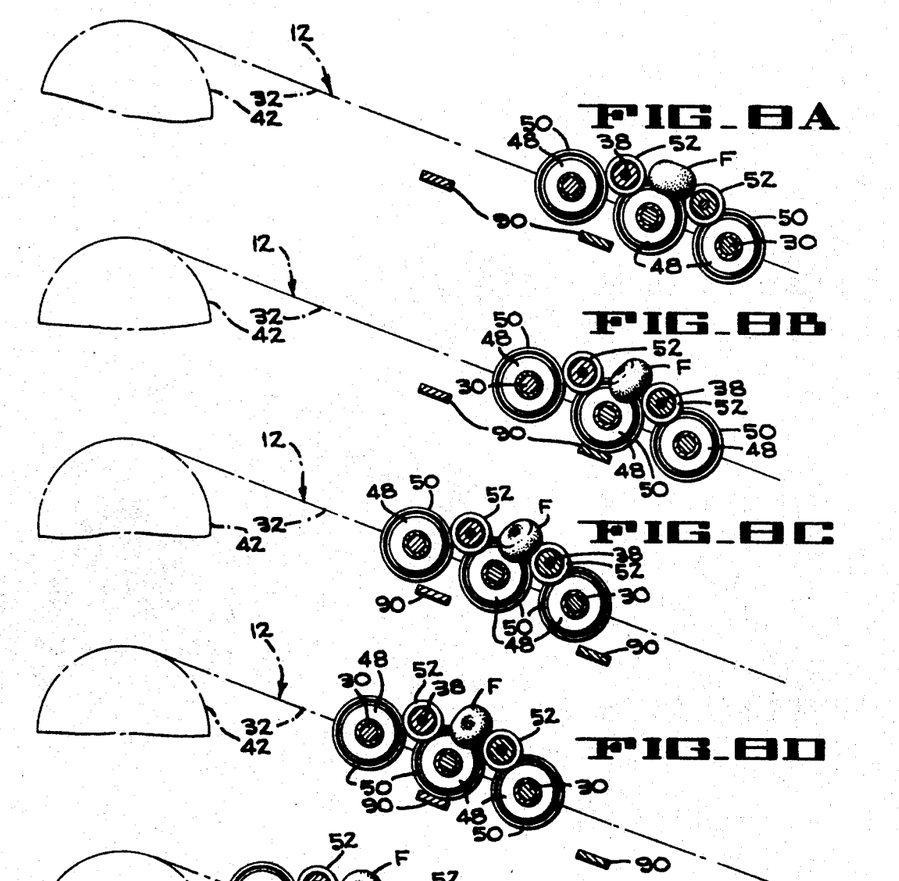
FIGS. 8A arthough 8F are diagrammatic operational views of the fruit orienting apparatus of the present invention illustrating a fruit being shifted about in a pocket between a pair of rollers to assume a desired spatial orientation wherein it is rolling upright on its major circumference.
Figures 8E, 8F:
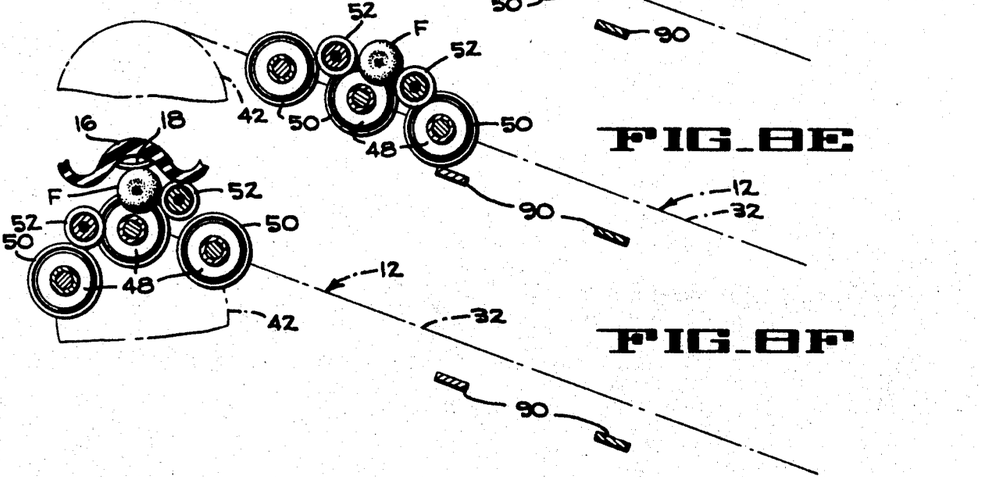

The operation of the orienting apparatus of the present invention can further be understood by reference to FIGS. 8A through 8F. In FIG. 8A, a portion of the conveyor 12 is shown with a symmetrical mandarin orange F having been deposited thereon so as to lie in a position identical to that shown in FIG. 10. If the orange were allowed to remain in this position relative to the supporting grommets it could conceivably flip over and over along the entire supporting run of the conveyor without changing its spacial orientation and, therefore, not be properly presented to the rotary marking apparatus 14 for the desired printing contact. However, in FIG. 8B, the free wheeling grommet 50, which is necessarily in contact with the orange when it is so spacially oriented, is shown engaging the contact pad 90 immediately therebeneath causing the grommet 50 to rotate counter to the direction of rotation of its associated grommet 48 which is in contact with the opposite side of the orange. It can be seen that the orange has been jostled by the secondary rotation imparted by the grommet 50 so that it has shifted its axis relative to the grommets and moved down into the troughed portion of the supporting grommet 48. FIG. 8C shows that continued movement of the conveyor toward the marking wheel with the associated rotation of the speed differentiated grommets 48 and 52 causes the orange to shift in the pocket to a more upright position. When the conveyor reaches the position shown in FIG. 8D the free wheeling grommet 50 has engaged the second underlying pad 90 causing the grommet to again rotate in a direction opposite to that of the other grommets on the rollers. However, in this instance, the rotation of grommet 50 will have no effect on the orange as it has shifted out of contact with the free wheeling grommet. As the portion of the conveyor carrying the orange approaches the marking wheel (FIG. 8E), the orange has been caused to assume a position wherein it is standing upright on its major circumference and has a rotating surface speed substantially identical to the surface speed of the marking wheel. In FIG. 8F, the orange is shown properly oriented and in compressive engagement with the die 18 on the marking wheel whereby a clear and legible mark is imprinted on its surface.

Although the best mode contemplated for carrying out the present invention has been herein shown and described, it will be apparent that modification and variation may be made without departing from what is regarded to be the subject matter of the invention.

What I claim is:

1. An orienting conveyor comprising a first and second set of rollers, each of said rollers of the first set being contoured to contact an article on two spaced circumferential bands and each of said rollers of the second set being contoured to contact the article on a circumferential band intermediate the contact bands of the rollers of the first set, at least one free wheeling roller segment comprising part of each of said rollers of the first set, means for rotating each set of rollers so that the peripheral speed of the second set of rollers at their points of contact with the articles is greater than the peripheral speed of the first set of rollers at their points of contact with the articles, and means for moving said rollers as a unit along a path substantially normal to the axes of rotation of the rollers.

2. An orienting conveyor as set forth in claim 1 including means for causing said free wheeling roller segment to rotate in a direction opposite to that of the article contacting rollers as said conveyor is moved along its path of travel.

3. An apparatus for orienting an oblate spheroid article so that it rolls on its major circumference, said apparatus comprising a pair of rollers at least one of which is provided with an annular recess forming an article support surface for retaining the article, said article support surface on said one roller contacting the article on two spaced circumferential bands, a free wheeling roller segment adjacent said article support surface on said one of said rollers, the other of said rollers being provided with a support surface contacting the article on a circumferential band intermediate said two contact bands of said one roller, and means for continuously rotating both of said rollers so that the peripheral speed of the roller having a single point of contact with the article is greater than the peripheral speed of the roller having two points of contact with the article.

4. The apparatus of claim 3 including means for causing said free wheeling roller segment to rotate in a direction opposite to that of the rollers.

5. A conveyor for feeding fruit comprising a first set of grommeted rollers having longitudinal axes lying transverse to the direction of travel of the conveyor, some of the grommets of the first set of rollers being driven and at least one of the grommets being free wheeling, a second set of grommeted rollers lying parallel to and interspaced between said first set of rollers to define fruit conveying pockets between the rollers, means rotatably supporting each end of said rollers for unitary movement along a path normal to their rotational axes, and means for rotating the first and second sets of rollers so that the peripheral speed of the grommets on the second set of rollers at their points of contact with the fruit are greater than the peripheral speed of the grommets on the rollers of the first set at their points of contact with the fruit.

6. Orienting apparatus for fruit of oblate spheroid shape having a minor dimension along the stem-blossom axis comprising first and second parallel rollers each having generally concave surfaces to cooperatively define a fruit retaining pocket, one of said rollers having a surface configured to contact a fruit of given size range at two spaced areas of contact, said latter roller including a free wheeling cylindrical segment laterally displaced from the two contact areas, the other of said rollers having a surface configured to contact the fruit at an area of contact in a plane substantially intermediate planes including said two spaced areas of contact, and means for rotating said rollers in the same direction such that the peripheral speed of said first roller is less than the peripheral speed of said second roller at the points of contact with a fruit, whereby a fruit thus rotated by said rollers ultimately achieves a stable position with its stem-blossom axis substantially parallel to the axes of said rollers.

7. Apparatus according to claim 6 including means for concurrently moving said rollers along a path normal to their rotational axes.

8. Apparatus according to claim 7 including means for rotating said cylindrical segment counter to the direction of rotation of the other roller surfaces.

References Cited

UNITED STATES PATENTS

| | | | |
|---|---|---|---|
| 2,296,645 | 9/1942 | Marsden | 198—33 AA |
| 3,300,021 | 1/1967 | Holmes | 198—33 AA |
| 1,902,244 | 3/1933 | King | 198—33 AA X |
| 2,713,934 | 7/1955 | Amori | 198—33 AA |

EVON C. BLUNK, Primary Examiner

H. S. LANE, Assistant Examiner

U.S. Cl. X.R.

146—224

PO-1050
(5/69)

UNITED STATES PATENT OFFICE
CERTIFICATE OF CORRECTION

Patent No. 3,715,024          Dated August 13, 1974

Inventor(s) HAROLD J MUMMA

It is certified that error appears in the above-identified patent and that said Letters Patent are hereby corrected as shown below:

Column 1, line 67, "not" should be --no--. Column 3, line 54, "arthough" should be --through--. Column 6, line 27, "coperate" should be --cooperate--. Column 6, line 70, "ot" should be --to--.

Signed and sealed this 5th day of November 1974.

(SEAL)
Attest:

McCOY M. GIBSON JR.          C. MARSHALL DANN
Attesting Officer          Commissioner of Patents